United States Patent [19]

Uemura

[11] 4,281,685

[45] Aug. 4, 1981

[54] ELECTROMAGNETIC LOCKING TYPE ACTUATOR

[75] Inventor: Tamio Uemura, Kawasaki, Japan

[73] Assignee: Tokico Ltd., Kawasaki, Japan

[21] Appl. No.: 24,039

[22] Filed: Mar. 26, 1979

[30] Foreign Application Priority Data

Mar. 24, 1978 [JP] Japan ................................. 53-33704

[51] Int. Cl.³ .............................................. F16K 31/08
[52] U.S. Cl. ..................................... 137/628; 251/65; 251/129; 335/234
[58] Field of Search ......................... 251/65, 129, 141; 335/230, 234; 137/628

[56] References Cited

U.S. PATENT DOCUMENTS

| | | | |
|---|---|---|---|
| 3,368,788 | 2/1968 | Paduca | 251/65 |
| 3,379,214 | 4/1968 | Weinberg | 251/65 X |
| 3,458,769 | 7/1969 | Stampfli | 335/234 X |
| 3,635,240 | 1/1972 | Vischulis et al. | 251/129 X |
| 3,670,768 | 6/1972 | Griswold | 251/141 X |

FOREIGN PATENT DOCUMENTS 790637  9/1935  France ..................................... 251/129

*Primary Examiner*—Arnold Rosenthal
*Attorney, Agent, or Firm*—Wenderoth, Lind & Ponack

[57] ABSTRACT

An electromagnetic locking type actuator is constituted by a control member reciprocatable in a fluid passage to control the fluid pressure in the passage, an electromagnetic device for applying a first magnetomotive force to the control member, and a magnetic device for always applying a second magnetomotive force to the control member. In the actuator, when an electric current in one direction is applied to the electromagnetic device the first and second magnetomotive forces are added to move the control member in an attracting direction so that the control member is attracted and held at its movement terminating position by the magnetic device even after the first magnetomotive force no longer acts at that position. When an electric current in a direction opposite to the one direction is applied to the electromagnetic device the first and second magnetomotive forces cancel each other thereby maintaining said control member in a magnetically released state.

7 Claims, 3 Drawing Figures

ELECTROMAGNETIC LOCKING TYPE ACTUATOR

BACKGROUND OF THE INVENTION

The present invention relates to an electromagnetic locking type actuator and, more particularly, to an actuator most suitable for use with an antiskid device of a vehicle.

Actuators heretofore used with antiskid devices of vehicles have been, for example, a vacuum type or hydraulic type. The vacuum type actuators, while requiring no power source and, accordingly, being low in cost, have such disadvantages as large overall dimensions, a relatively large space for installation, and low response. On the other hand, the hydraulic type actuators, while relatively high in response, have such disadvantages as the need for a power source and high cost. Further, while a spring force locking type actuator utilizing an electromagnetic force and a spring force but requiring no fluid pressure has been developed, it has such a large total weight that it is not suitable for practical application.

SUMMARY OF THE INVENTION

Accordingly, it is a primary object of the present invention to overcome the disadvantages of previously known actuators and more particularly to provide an electromagnetic locking type actuator using in combination an electromagnetic circuit and a magnetic means applying a magnetic force at all times.

It is a further and more specific object of the present invention to provide an electromagnetic locking type actuator which has a high in response, has a low manufacturing cost, and has a relatively simple structure and yet is light in weight.

These and other objects and features of the present invention will be apparent from the contents of the specification hereinafter disclosed.

BRIEF DESCRIPTION OF THE DRAWINGS

The invention will be better understood from the following description taken in connection with the accompanying drawings in which:

FIG. 1a is a sectional view of a plunger shaft taken along the line A—A' of FIG. 1.

DESCRIPTION OF THE PREFERRED EMBODIMENTS

Figure 1:
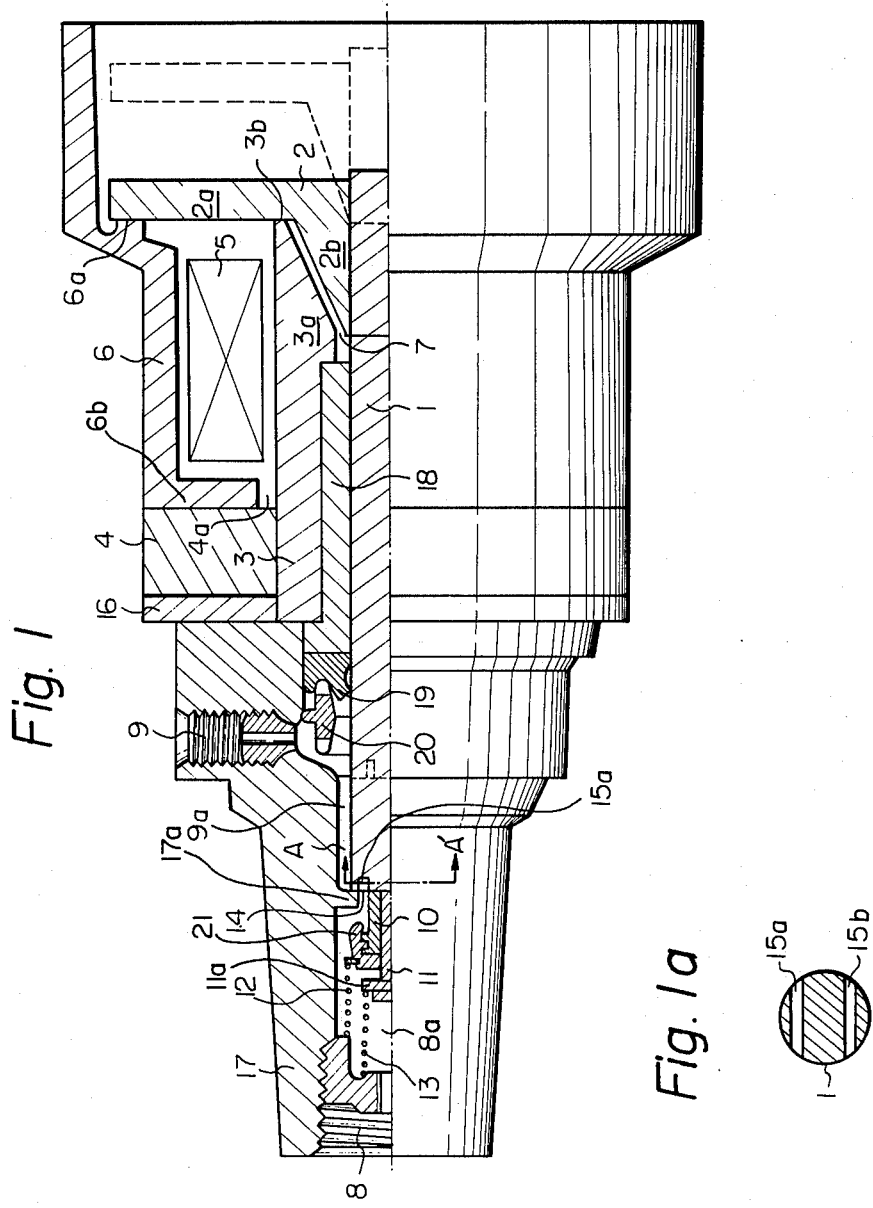
FIG. 1 is a partially sectional schematic structural view of a first embodiment of the present invention.

With reference now to the drawings and more particularly to FIG. 1, there is illustrated a first embodiment of the present invention, partly in section.

A plunger shaft 1 and a disc-shaped armature 2 fitted at an end thereof constitute a reciprocatable control member. A tubular inner yoke 3 has mounted thereon a permanent magnet 4 and an electromagnetic coil 5. The permanent magnet 4 is held between a tubular outer yoke 6 and an annular side yoke 16. On the righthand side of the permanent magnet 4 in the drawing, an electromagnetic coil 5 is held between the inner yoke and the outer yoke 6. The inner yoke 3, the outer yoke 6, a flat portion 2a and a conical portion 2b of the disc-shaped armature 2, and a gap 7 between a tapered portion 3a of the inner yoke 3 and the conical portion 2b of the disc-shaped armature 2 form a magnetic path for passage of flux generated by the permanent magnet 4 and the electromagnetic coil 5. The outer yoke 6 is provided with an adequate gap 4a for preventing the flux of the permanent magnet 4 from leaking directly to the inner yoke 3 through a flange portion 6b of the outer yoke 6. The electromagnetic coil 5 is constructed so as to be excited by an electric current in a first direction or an electric current in a second direction opposite to the first direction. When the electric current in the first direction is applied to the coil 5, the disc-shaped armature 2 is attracted by the electromagnetic force of the coil. Subsequently, when the disc-shaped armature 2 reaches the movement terminating position shown by solid lines in FIG. 1 and the current in the first direction is discontinued, only the magnetic force of the permanent magnet 4 holds the disc-shaped armature 2 at such position. On the contrary, when the electric current in the second direction or in the direction opposite to the first direction is applied to the electromagnetic coil 5, the electromotive force of the electromagnetic coil 5 and the electromotive force by the permanent magnet 4 cancel each other out so as to thereby maintain the disc-shaped armature 2 in a magnetically released state.

A check valve 10, comprising an annular valve portion 21, is biased rightward as shown in FIG. 1 by a spring 12 and is adapted to engage the left side of an annular partition wall 17a which thereby acts as a valve seat. The partition wall 17a has an opening 14 therethrough. When the plunger shaft 1 moves to the far right, valve portion 21 seats with 17a, thereby closing the valve. In the valve opening condition shown in FIG. 1, an annular shoulder formed on the left end of the plunger shaft 1 engages the right side of the annular partition wall 17a, which thereby acts as a stop. However, as shown in FIG. 1a, there are grooves 15a formed in the shoulder of the plunger shaft 1 which allow liquid flow through the valve.

A bleeder valve 11 biased rightward by a spring 13 moves integrally with the plunger shaft 1 and allows a predetermined amount of additional or marginal rightward movement of the plunger shaft 1 after the closure of the valve 10. The marginal rightward movement of the plunger shaft 1 increases the volume of the chamber A by an annular area defined between the outer diameter of the plunger shaft 1 and the stem portion of the valve 11. Thus, the pressure in the chamber A can be substantially decreased, due to this increase in volume, thereby avoiding the skidding condition when the device is used in the hydraulic braking system. The rate of pressure decrease in the chamber A can be substantially controlled by selecting a given diameter of the stem portion of the valve 11. When the valves 10 and 11 are in their rightwardmost position, a valve portion 11a engages valve 10 to thereby prevent further rightward movement of the plunger shaft 1. Besides acting as a stop member for plunger shaft 1, valve portion 11a, by engaging valve 10 as previously mentioned, acts to substantially block a portion of the opening 14.

Assuming that the control member comprising the plunger shaft 1 and the disc-shaped armature 2 is in the position shown by broken lines in FIG. 1, a check valve 10 and a bleeder valve 11 disposed in a fluid passage 8a of a control body 17 are biased to the rightwardmost end of said passage by springs 12 and 13, respectively, to block an opening 14, thereby completely isolating the fluid passage 8 and a fluid passage 9 from each other.

That is, the fluid pressure in the passage 9a becomes approximately zero.

When the electric current in the first direction is applied to the electromagnetic coil 5, the magnetic flux generated thereby flows in the outer yoke 6, the flat and conical portions 2a and 2b, respectively, of the disc-shaped armature 2, the gap 7 and the inner yoke 3, whereby the magnetic attraction of the electromagnetic coil 5 is largely generated at the tapered portion 3a of the inner yoke 3. At this time, the magnetic flux generated by the permanent magnet 4 is added to on the magnetic flux generated by the electromagnetic coil 5 to increase the magnetic attraction thereof. However, the magnetomotive force of the permanent magnet 4 is far smaller than the electromotive force of the electromagnetic coil 5.

The disc-shape armature 2 is attracted until it reaches the movement terminating position shown by solid lines in FIG. 1 at which the flat portion 2a of the disc-shaped armature 2 abuts against a ring-shaped projection 6a of the outer yoke 6 and the flat portion 3b of the inner yoke 3, and the magnetic reluctance of the magnetic path is rapidly reduced to a state of magnetic saturation. In this state, when the first direction current is cut off, the electromotive force of the electromagnetic coil 5 disappears and only the electromotive force of the permanent magnet 4 remains. However, since the reluctance of the magnetic path is, as mentioned above, a very small value, the disc-shaped armature 2 can be held at the movement terminating position shown by solid lines in FIG. 1 only by the magnetic force of the permanent magnet 4. During the movement of the disc-shaped armature 2, toward the abutment 6a as the fluid pressure in the fluid passage 9, 9a is gradually increased by advancement of the plunger shaft 1 thereinto, the forward end of the plunger shaft 1 urges the check valve 10 and the bleeder valve 11 leftward against the springs 12 and 13, respectively, thereby unblocking the opening 14 to place the fluid passages 8, 8a and 9, 9a in communication with each other and make the fluid pressure throughout all of these passages equal. Accordingly, variation of the fluid pressure in the passage 8, 8a is conveyed without alteration to the passage 9, 9a.

When the disc-shaped armature 2 is in the position shown by solid lines in FIG. 1 as described above, and an electric current in the second direction capable of generating a magnetomotive force substantially equal to the magnetomotive force of the permanent magnet 4 is applied to the electromagnetic coil 5, the magnetic flux in the magnetic path disappears and the disc-shaped armature 2 is in a magnetically released state. Accordingly, the plunger shaft 1 is quickly moved rightward in FIG. 1 by the fluid pressure in the fluid passage 8, 8a. At this time, the check valve 10 initially substantially blocks the opening 14. However, the bleeder valve 11 is in an open state to allow a small amount of the fluid to pass through a choke passage (not shown) defined between the check valve 10 and the bleeder valve 11. With the continued rightward movement of the plunger shaft 1, the opening 14 is completely blocked by the bleeder valve 11. Thus, the successive blocking of the opening 14 by the check valve 10 and the bleeder valve 11 prevents a sudden increase of the fluid pressure in the fluid passage 8, 8a.

According to the present invention, as described in detail hereinabove, it is possible to provide an electromagnetic locking type actuator in which electric currents in opposite directions are applied alternately to the electromagnetic coil 5 to repeat the reciprocating movement of the plunger shaft 1, thereby varying the fluid pressure in the fluid passage 9 alternately over the range from the maximum to the minimum values.

FIG. 1a shows a plunger shaft having groove-shaped fluid passages 15a and 15b, in section taken along the line A—A' of FIG. 1.

Further in FIG. 1, numeral 18 denotes a bearing for supporting the plunger shaft 1 reciprocatably, 19 denotes a seal member, and 20 denotes a holder for the seal member 19.

Figure 2:
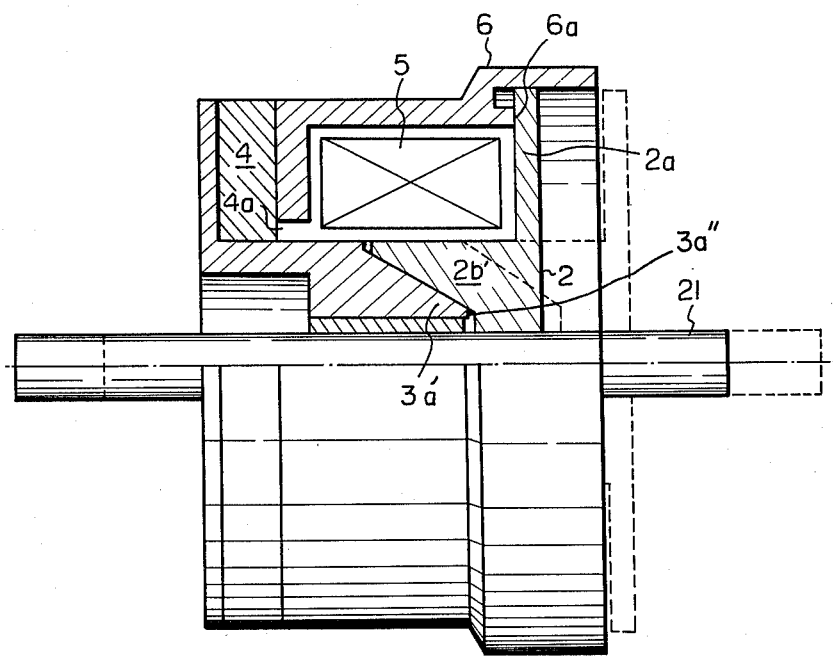
FIG. 2 is a partially sectional schematic structural view of a second embodiment of the present invention.

FIG. 2 shows an essential portion of the second embodiment of the present invention. The second embodiment differs from the embodiment shown in FIG. 1 in that the disc-shaped armature 2 has a tapered portion 2b' and the inner yoke 3 has a conical portion 3a' in the second embodiment. When the disc-shaped armature 2 is attracted from the position shown by broken lines in FIG. 2 to the position shown therein by solid lines, the ring-shaped projection 6a of the outer yoke 6 abuts against the flat portion 2a, and the tapered portion 2b' of the disc-shaped armature 2 abuts against the conical portion 3a' of the inner yoke 3, leaving a small gap defined between the end 3a'' of the conical portion 3a' and the disc-shaped armature 2. Other structural features and the operation of the embodiment shown in FIG. 2 are similar to those of the embodiment shown in FIG. 1.

With the construction as described above, the present invention is applicable to various fluid control systems and, particularly, is most suitable for an antiskid device of a vehicle. The actuator according to the present invention included, for example, in the antiskid device of vehicle, is operable to carry out ideal brake control by processing a signal obtained by detecting the speed of the wheels through a suitable arithmetic operation circuit, applying a control signal generated thereby to the electromagnetic coil 5 as an exciting current, connecting the fluid passage 8 with the master cylinder connected to the brake pedal, and communicating the other fluid passage 9 with the brake cylinder.

The present invention is also applicable as an actuator for an electromagnetic valve for opening and closing a fluid circuit. In such application, the shaft 21 shown in FIG. 2 is preferably used as a valve rod for driving the electromagnetic valve body.

According to the present invention, due to elimination of the power source as used in the conventional hydraulic actuators it is possible to provide an improved actuator which is small in size, light in weight and much more superior in response and control than the conventional actuators.

While we have shown and described specific embodiments of the invention, it will be understood that these embodiments are merely for the purpose of illustration and description and that various other forms may be devised within the scope of the invention, as defined in the appended claims.

What is claimed is:

1. An electromagnetic locking type actuator, comprising:
    a body having a fluid passage therethrough;
    a control member reciprocatable in said body for controlling the fluid pressure in said passage;
    an electromagnetic means positioned on said body for applying a first magnetomotive force to said control member, said electromagnetic means having an inner yoke, an outer yoke including a flange portion around said inner yoke, an electromagnetic coil between said inner and outer yokes, and means for directing an energizing current through said coil in one direction and in a second direction which is the opposite of said one direction; and a permanent magnet means positioned adjacent to and separated from said electromagnetic coil by said flange portion of the outer yoke for directing flux to said yokes for applying a second magnetomotive force in one direction to said control member at all times, said electromagnetic means, when an electric current in one direction is applied thereto, generating a first magnetomotive force in the said one direction for moving said control member toward said permanent magnet means and said electromagnetic means to a movement terminating position, and said permanent magnet means holding said control member at said movement terminating position after said first magnetomotive force no longer acts after the electric current is discontinued, and when an electric current in a direction opposite said one direction is applied thereto, generating a first magnetomotive force cancelling out said second magnetomotive force, whereby said control member is released from the effect of magnetomotive forces; said electromagnetic means having a magnetic gap between said inner yoke and said flange portion of the outer yoke for preventing the flux of said permanent magnet means from leaking directly to said inner yoke from said flange portion of the outer yoke.

2. An electromagnetic locking type actuator as claimed in claim 1 in which said control member comprises a plunger shaft in said fluid passage and a disc-shaped armature disposed at one end thereof opposed to said electromagnetic means and said permanent magnet means for being acted on by the magnetic flux from said electromagnetic means and said permanent magnet means.

3. An electromagnetic locking type actuator as claimed in claim 2 in which said inner yoke has a conical portion thereon facing said disc-shaped armature, and said disc-shaped armature has a conical portion thereon substantially complementary to said conical portion on said inner yoke and opposed thereto and movable into close association therewith when said armature is moved to said movement terminating position.

4. An electromagnetic locking type actuator as claimed in claim 3 in which said conical portions come into contact with each other when said armature is moved to said movement terminating position.

5. An electromagnetic locking type actuator as claimed in claim 1 further comprising valve members in said fluid passage movable in response to the movement of said control member for controlling blocking and unblocking of said fluid passage.

6. An electromagnetic locking type actuator as claimed in claim 5 in which said valve members are a first and a second valve member operable in succession.

7. An electromagnetic locking type actuator as claimed in claim 1 further comprising valve members in said fluid passage movable in response to the movement of said control member, whereby when the control member is released from the effect of said magnetomotive forces, the fluid pressure in said passage tends to move said control member in a direction opposite to said one direction so that said valve members move to their seating positions and close said passage.

* * * * *